United States Patent
Li (10) Patent No.: US 6,178,367 B1
(45) Date of Patent: Jan. 23, 2001

(54) BRAKE SYSTEM FOR A MOTOR-DRIVEN VEHICLE

(76) Inventor: Shu-Shien Li, 5F, No. 21, Lane 16, Sec. 2, Chung Shan N. Rd., Taipei (TW)

( * ) Notice: Under 35 U.S.C. 154(b), the term of this patent shall be extended for 0 days.

(21) Appl. No.: 09/204,563

(22) Filed: Dec. 4, 1998

(51) Int. Cl.[7] ....................................................... B62L 1/06
(52) U.S. Cl. ................... 701/70; 701/72; 701/83; 188/24.14; 188/24.11; 188/24.12; 303/20; 303/140; 303/146; 303/147
(58) Field of Search .................. 701/70, 72, 81, 701/83; 188/24.15, 24.16, 24.19, 24.21, 24.22; 303/20, 140, 146, 147

(56) References Cited

U.S. PATENT DOCUMENTS

| | | | |
|---|---|---|---|
| 5,215,167 | * | 6/1993 | Davidson ............................ 188/24.19 |
| 5,743,360 | * | 4/1998 | Ke ....................................... 188/24.19 |
| 5,829,845 | * | 11/1998 | Maron et al. ............................ 303/20 |
| 5,979,608 | * | 11/1999 | Muraoka ............................ 188/24.14 |

\* cited by examiner

*Primary Examiner*—William A. Cuchlinski, Jr.
*Assistant Examiner*—Marthe Marc-Coleman
(74) *Attorney, Agent, or Firm*—Bacon & Thomas, PLLC (57) ABSTRACT

A brake system for a motor-driven vehicle includes a brake device driven by a brake cable to stop the motor-driven vehicle from moving, two electrically conductive friction means respectively fastened to the brake device and driven by the brake device to press on two opposite sides of a metal part of wheel means of the motor-driven vehicle in stopping the motor-driven vehicle from moving, a main processor, which controls the operation of the motor of the motor-driven vehicle, and two electric wires respectively connected between the electrically conductive friction means and two opposite terminals of the main processor; wherein when the electrically conductive friction means are forced by the brake device to press on the two opposite sides of the metal part of the wheel means of the motor-driven vehicle, the main processing unit is induced to cut off power supply from the motor of the motor-driven vehicle.

7 Claims, 9 Drawing Sheets

BRAKE SYSTEM FOR A MOTOR-DRIVEN VEHICLE

BACKGROUND OF THE INVENTION (a) Field of the Invention

The present invention relates to a brake system for a motor-driven vehicle, and more particularly to such a brake system which automatically cuts off power supply from the motor-driven vehicle when driven to stop the vehicle from moving.

(b) Description of the Prior Art

Figure 1:
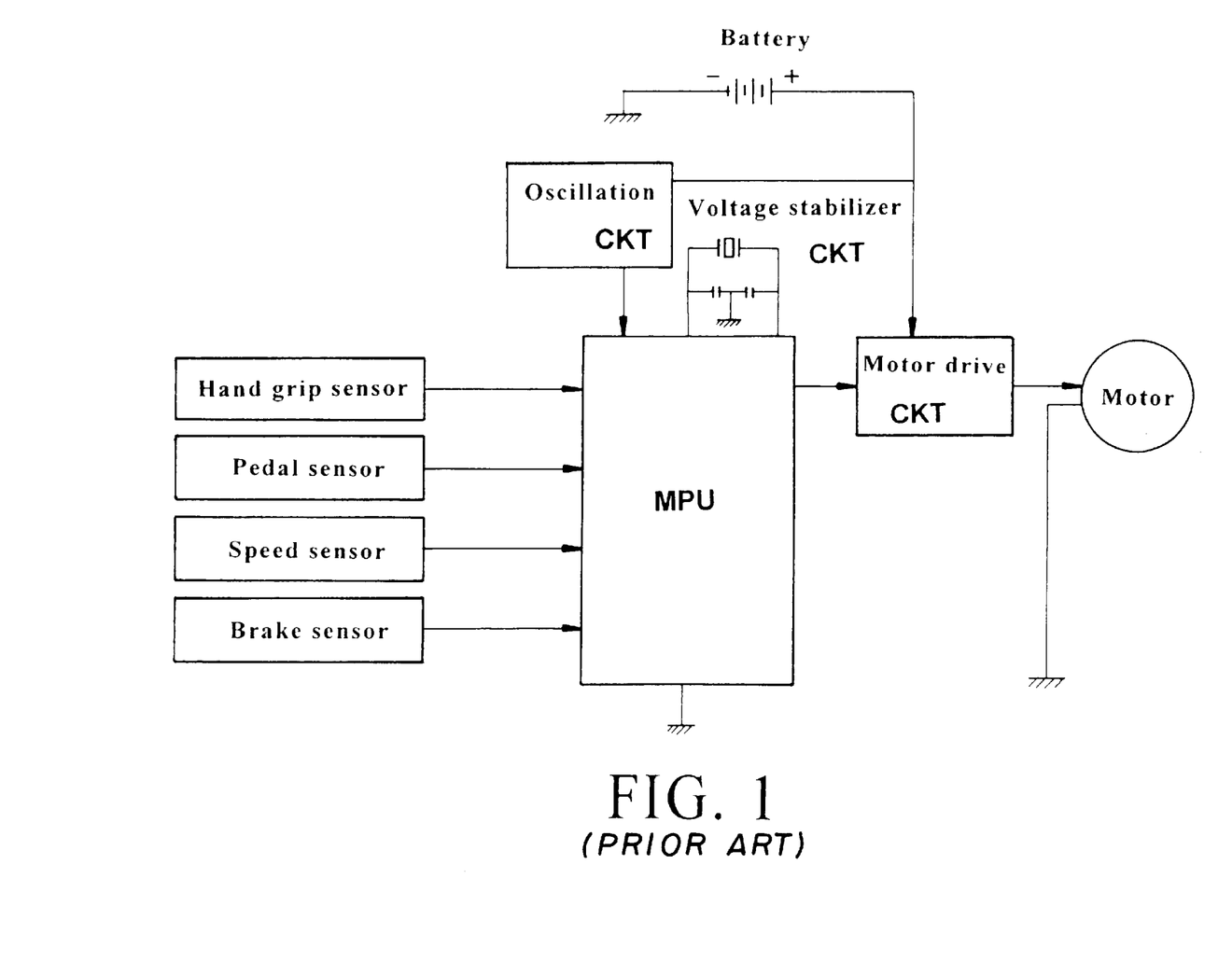
FIG. 1 is a circuit block diagram of the brake system of a motor-driven vehicle according to the prior art.

The motor of a regular motor-driven vehicle, for example, a motor bicycle, is controlled through power source, which is controlled by a main processing unit and sensor means. As illustrated in FIG. 1, handle grip sensor means, pedal sensor means, vehicle speed sensor means and brake sensor means are respectively connected to a main processing unit, which receives power supply from a battery through a voltage stabilizer circuit, and controls a motor drive to drive the motor subject to detected message from the sensor means connected thereto. The brake sensor means is commonly installed in the hand grip to detect displacement of the brake lever or brake cable. When the brake lever or brake cable is moved over a predetermined distance, the brake sensor means immediately outputs a signal to the main processing unit, causing it to cut off power supply from the motor. This design is not satisfactory in function. Because an elastic fatigue tends to occur after long uses of the brake system, the brake sensor means may be unable to accurately detect the braking operation of the brake system, i.e., the brake sensor means may output an error signal to the main processing unit, causing the main processing unit to keep the motor operating when the rider stops the vehicle, or causing the main processing unit to cut off power supply from the motor when the vehicle is running.

SUMMARY OF THE INVENTION

The present invention has been accomplished to provide a brake system for a motor-driven vehicle which eliminates the aforesaid problems. According to the present invention, the brake system is mounted on a motor-driven vehicle and controlled to stop the motor-driven vehicle from moving and to simultaneously cut off power supply from the motor of the motor-driven vehicle, the brake system comprising: a brake device driven by brake cable means to stop the motor-driven vehicle from moving; two electrically conductive friction means respectively fastened to the brake device and driven by the brake device to press on two opposite sides of a metal part of wheel means of the motor-driven vehicle in stopping the motor-driven vehicle from moving; a main processor, which controls the operation of the motor of the motor-driven vehicle; and two electric wires respectively connected between the electrically conductive friction means and two opposite terminals of the main processor; wherein when the electrically conductive friction means are forced by the brake device to press on the two opposite sides of the metal part of the wheel means of the motor-driven vehicle, the electric wires are electrically connected to produce a signal to the main processing unit, causing the main processing unit to cut off power supply from the motor of the motor-driven vehicle. According to one embodiment of the present invention, the electrically conductive friction means each have a tubular mounting rod at an outer side respectively fastened to brake arms of the brake device the electric wires are respectively connected to the electrically conductive friction means and extended out of the tubular mounting rods of the electrically conductive brake shoes. According to another embodiment of the present invention, the brake device comprises a binding ring, which supports the electrically conductive friction means, an insulative layer retained between the electrically conductive friction means and the binding ring, and a metal brake disk, which is forced by the electrically conductive friction means to stop the motor-driven vehicle from moving. According to still another embodiment of the present invention, the brake device comprises two brake arms, a metal brake disk mounted on a wheel, and two brake shoes respectively mounted on the brake arms and insulated from the brake arms by electrically insulative means and driven to stop the metal brake disk from rotation; the two electrically conductive friction means are respectively fastened to the brake shoes of the brake device and moved with the brake shoes to press on the two opposite sides of the metal brake disk.

DETAILED DESCRIPTION OF THE PREFERRED EMBODIMENT

Figure 2:
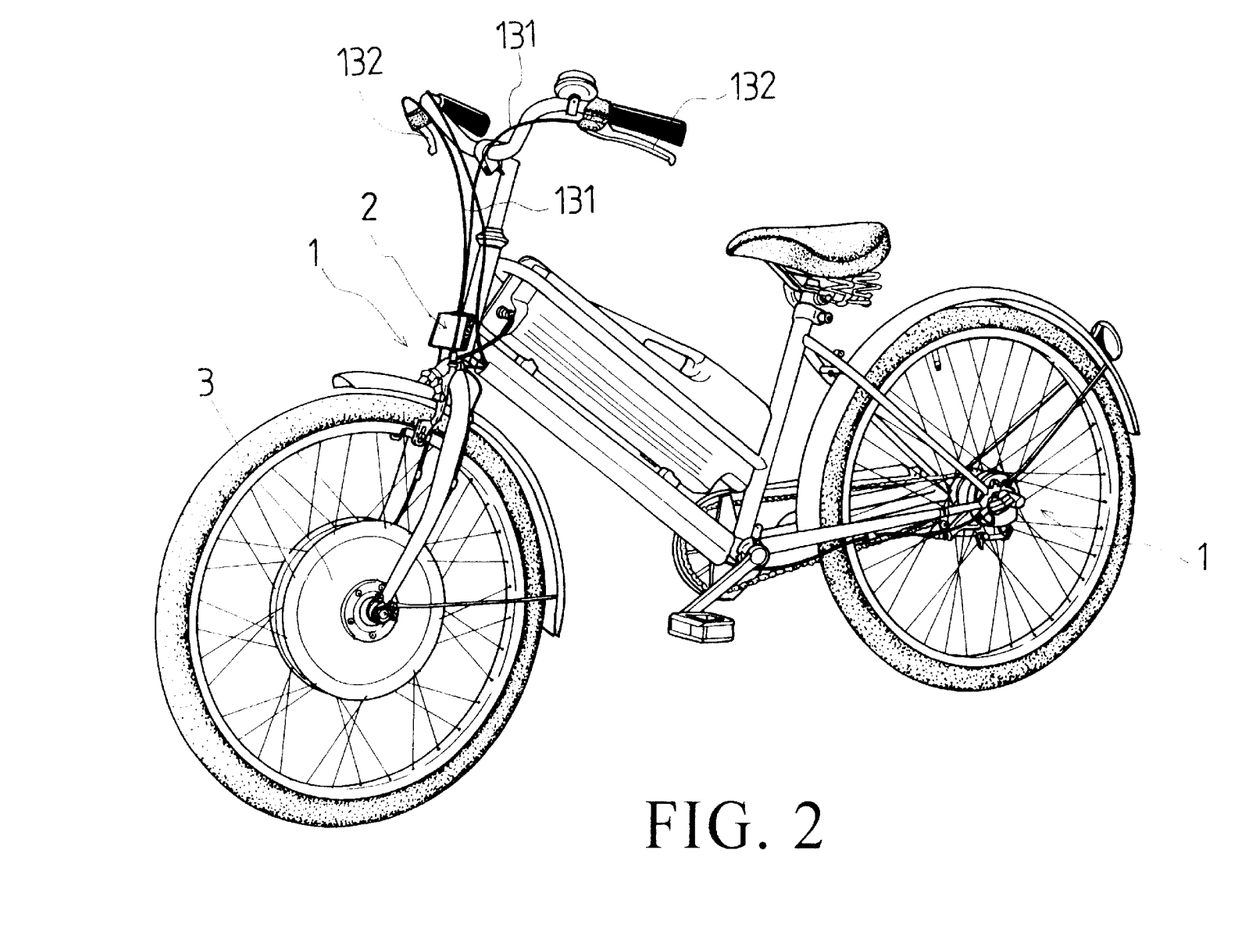
FIG. 2 illustrates a brake system installed in a motor-driven vehicle according to the present invention.

Referring to FIG. 2, a brake detector 1 is installed in a motor-driven vehicle, and connected to a main processing unit 2, which controls the operation of the motor 3 of the motor-driven vehicle. When the brake levers 132 are operated to pull the respective brake cables 131, the brake detector 1 is induced to output a signal to the main processing unit 2, causing the main processing unit 2 to cut off power supply from the motor 3.

Figure 3:
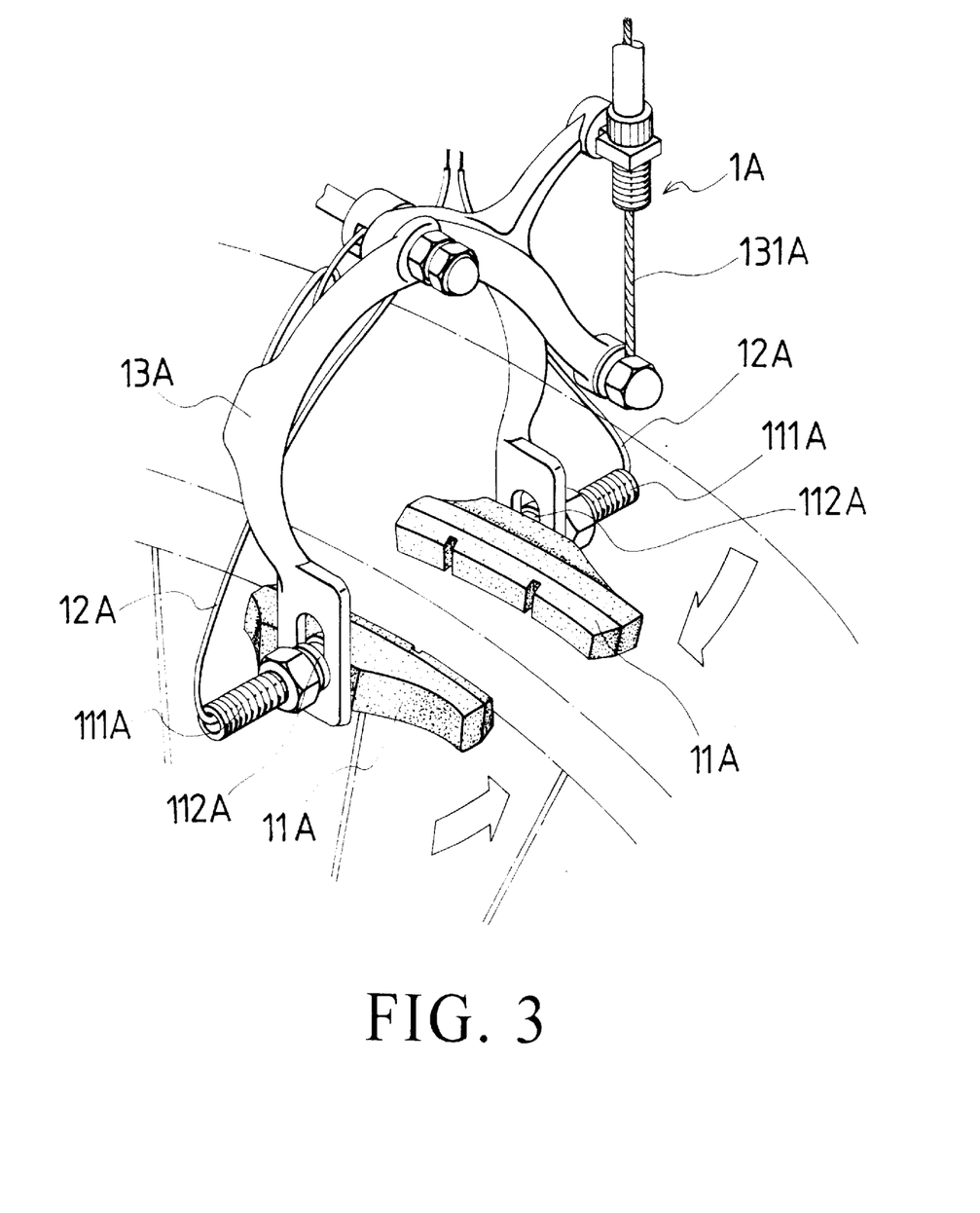
FIG. 3 is a perspective view of a brake detector for a brake system according to the first embodiment of the present invention.
Figure 4:
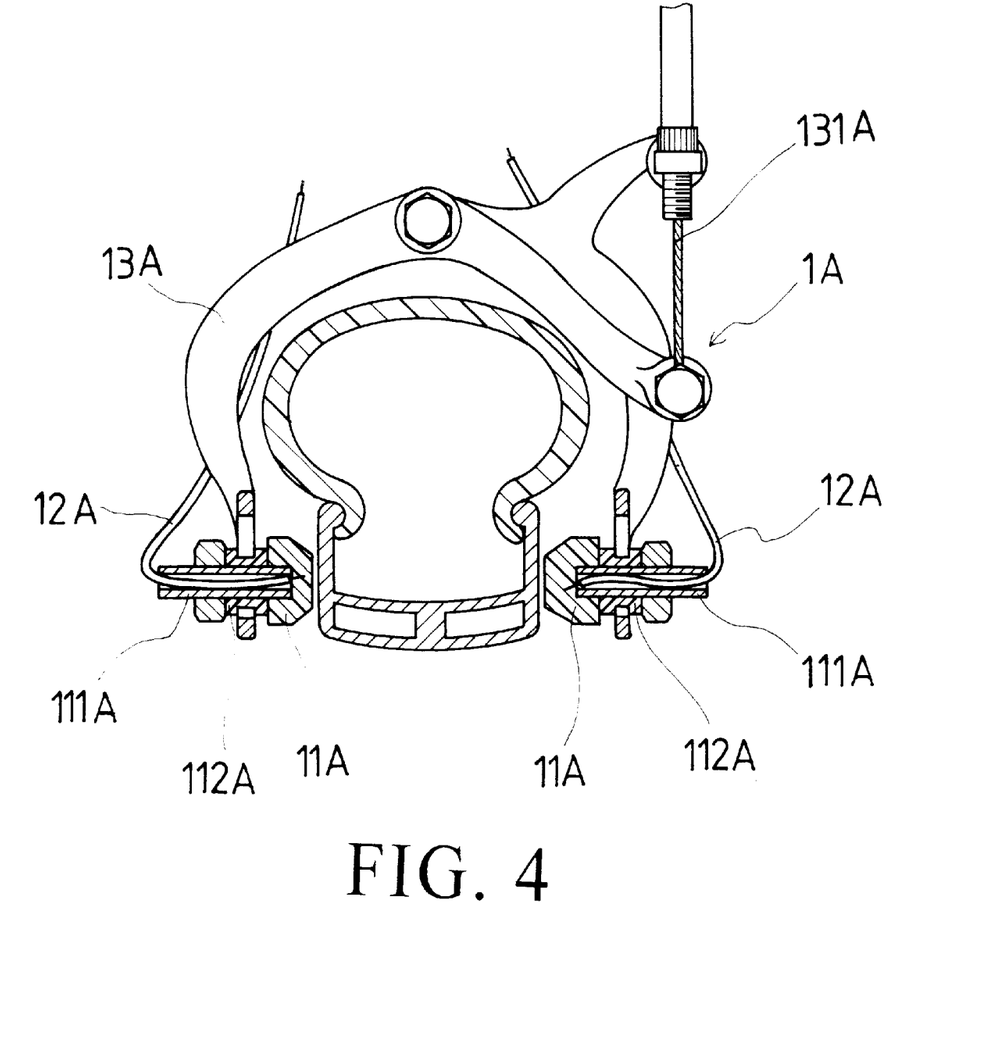
FIG. 4 is a sectional view of the brake detector of the first embodiment of the present invention.
Figure 5:
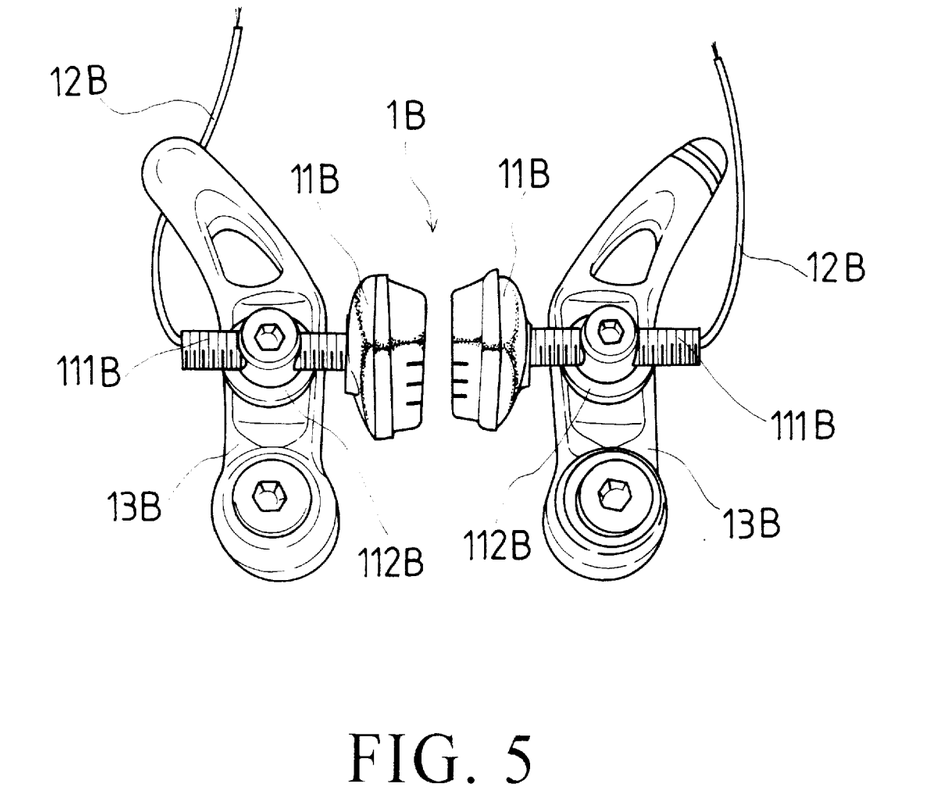
FIG. 5 is a perspective view of a brake detector for a brake system according to a second embodiment of the present invention.

Referring to FIGS. 3, 4 and 5, the brake detector 1A comprises two electrically conductive brake shoes 11A respectively connected to two brake arms 13A, which are driven by the brake cable 131A to move the brake shoes 11A toward the periphery of the wheel. The brake shoes 11A are made of rubber containing electrically conductive powder substances, each having a tubular mounting rod 11A at an outer side fastened to the corresponding brake arm 13A. Two electric wires 12A are respectively inserted through the tubular mounting rods 11A and connected to the electrically conductive brake shoes 11A. The opposite ends of the electric wires 12A are respectively connected to the main processing unit of the motor-driven vehicle. Further, insulative cushions 112A are respectively mounted on the tubular mounting rod 11A to prevent direction contact between the tubular mounting rod 11A and the respective brake arm 13A. When the brake cable 131A is pulled to move the brake arms 13A toward each other, the brake shoes 11A are forced against the metal rim of the wheel of the motor-driven vehicle (see FIG. 4), causing the metal rim of the wheel of the motor-driven vehicle, the brake shoes 131A, the electric wires 12A and the main processing unit form a closed circuit, and therefore the main processing unit is induced to cut off power supply from the motor of the motor-driven vehicle.

FIG. 5 shows an alternate form of the present invention. According to this alternate form, the brake detector 1B comprises two electrically conductive brake blocks 11B, each brake block 11B having a tubular mounting rod 111B fastened to one brake arm 13B and insulated from the corresponding brake arm 13B by insulative cushions 112B, and two electric wires 12B respectively connected to the brake blocks 11B and extended out of the tubular mounting rods 11B of the brake blocks 11B. When the brake arms 13B are driven to move the brake blocks 11B to the braking position, the brake blocks 11B and the electric wires 12B form a closed circuit, causing the connected main processing unit to cut off power supply from the motor of the motor-driven vehicle.

Figure 6:
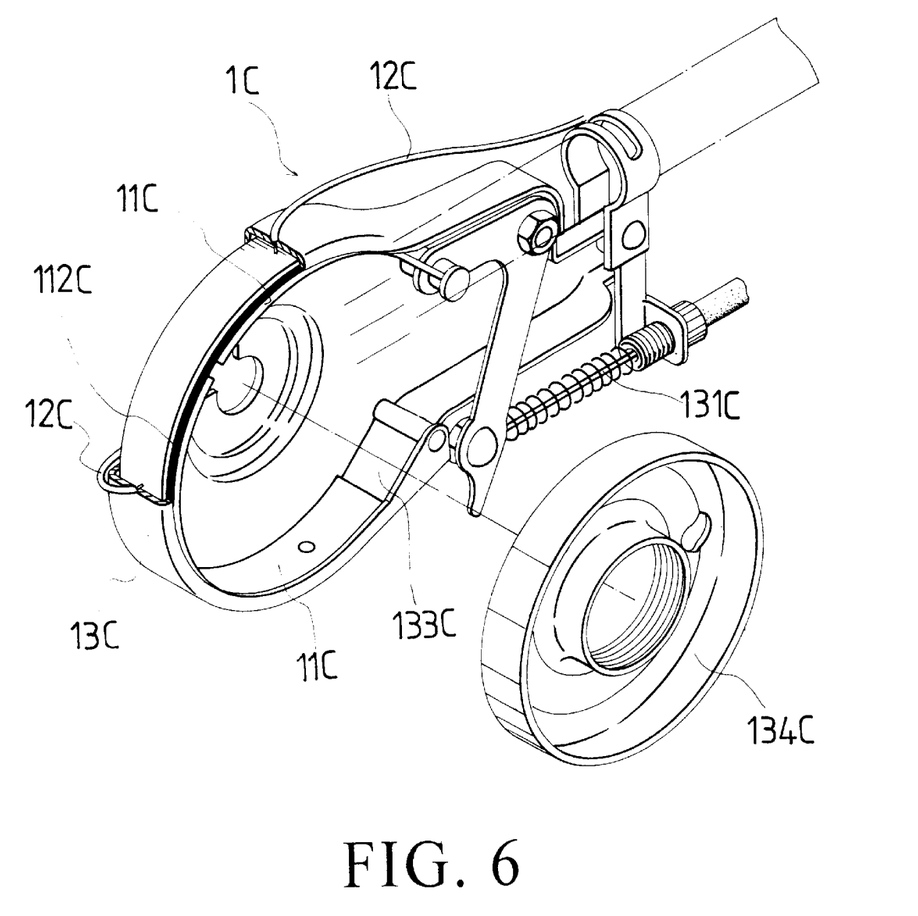
FIG. 6 is a perspective view of a brake detector for a brake system according to a third embodiment of the present invention.
Figure 7:
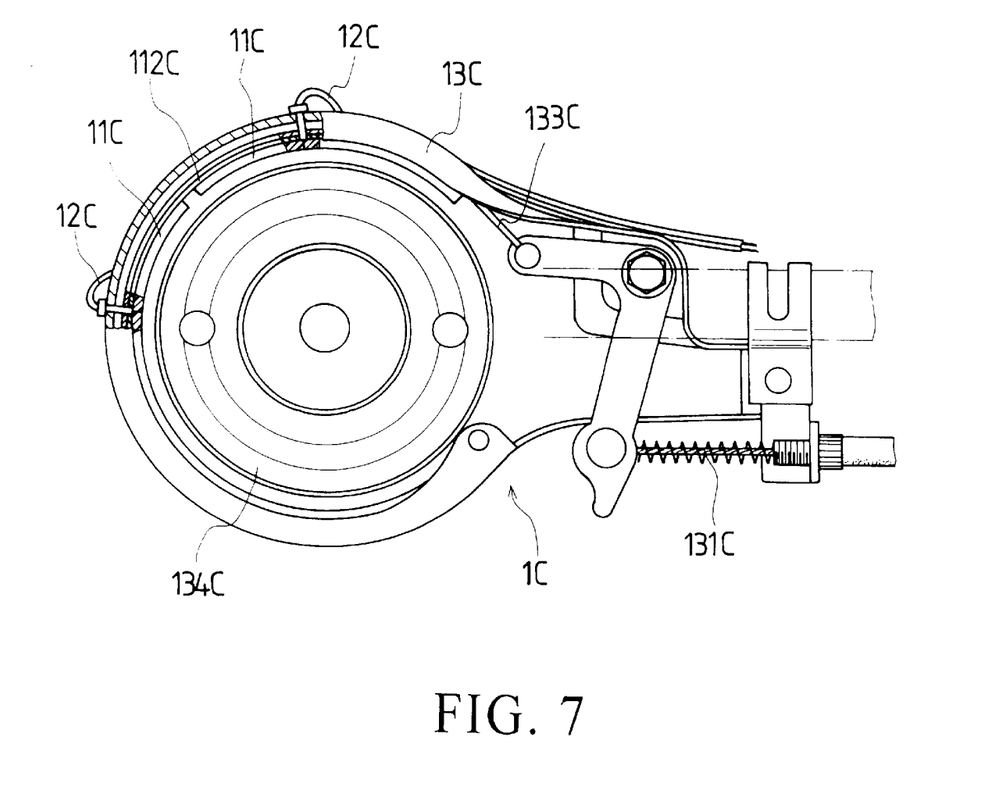
FIG. 7 is a side view of the brake detector of the third embodiment of the present invention.

FIGS. 6 and 7 show another alternate form of the present invention. According to this alternate form, the brake detector 1C comprises two electrically conductive brake linings 11C mounted in the binding ring 133C of the brake holder 13C and spaced from each other at a distance, an insulative layer 112C retained between the brake linings 11C and the binding ring 133C, two electric wires 12C respectively extended from the brake linings 11C to a main processing unit (not shown). When the brake cable 131C is driven to pull up the binding ring 133C, the brake linings 11C are forced into close contact with the brake disk 134C, causing the motor-driven vehicle to be stopped, and at the same time causing the main processing unit to cut off power supply from the motor of the motor-driven vehicle.

Figure 8:
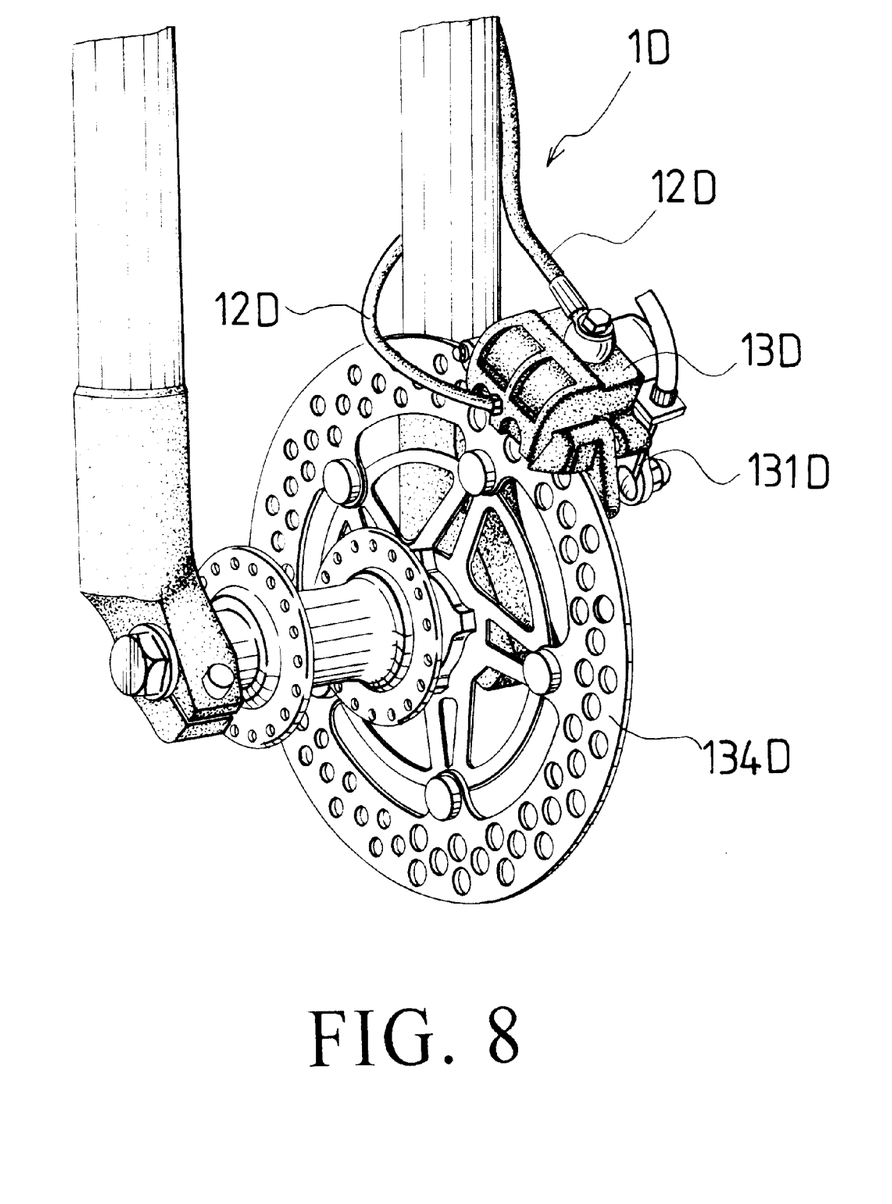
FIG. 8 is a perspective view of a brake detector for a brake system according to a fourth embodiment of the present invention.
Figure 9:
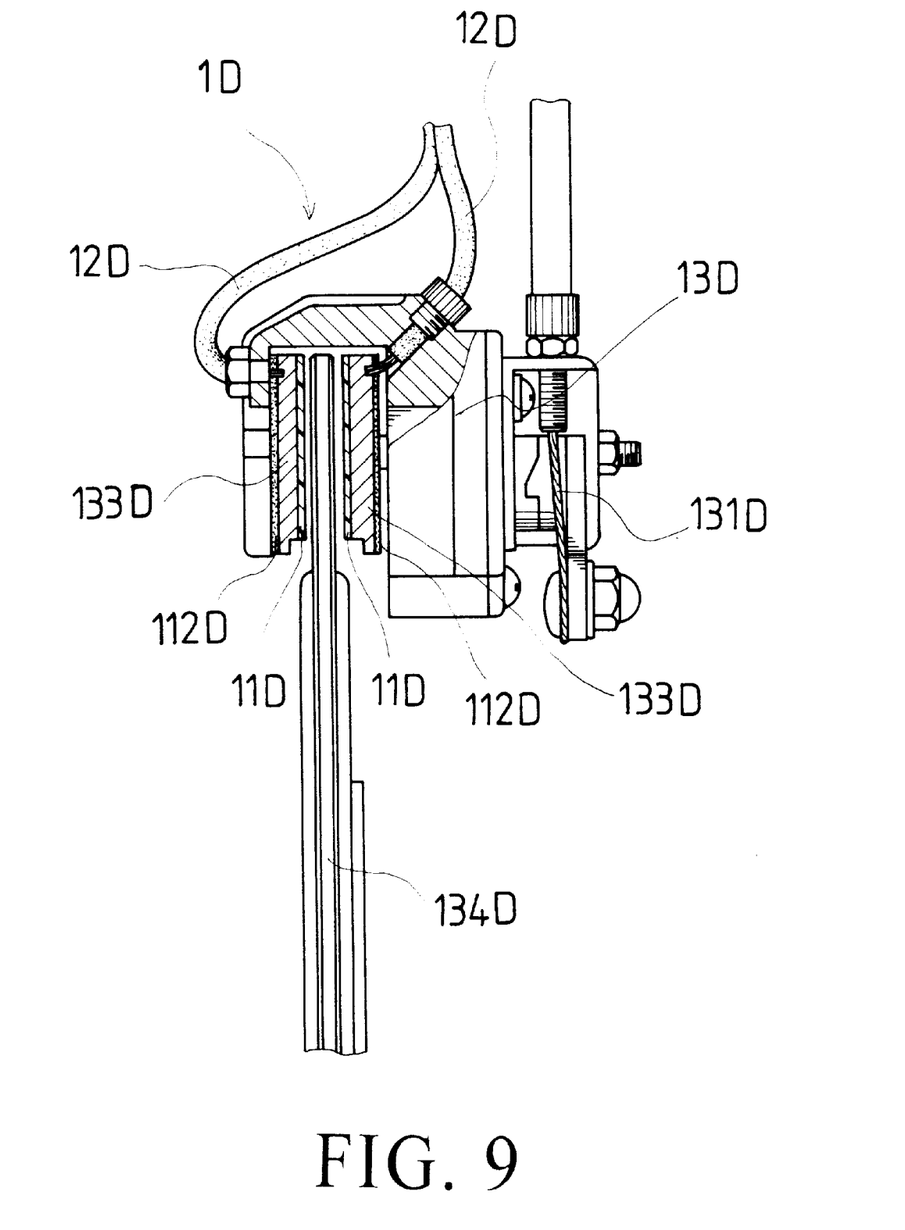
FIG. 9 is a sectional view of the brake detector of the fourth embodiment of the present invention.

FIGS. 8 and 9 show still another alternate form of the present invention. According to this alternate form, the brake detector 1D comprises two electrically conductive brake linings 11D respectively fastened to the brake shoes 133D of brake arms 13D and moved with the brake shoes 133D to press on the two opposite sides of a brake disk 134D, two electric wires 12D respectively extended from the brake linings 11D and connected to a main processing unit. Further, the brake shoes 133D are insulated from the brake arms 13D by insulative cushions 112D. When the brake cable 131D is pulled up, the brake arms 13D are driven to move the brake shoes 133D toward each other, thereby causing the brake linings 11D to be pressed on the two opposite sides of the brake disk 134D, and therefore the brake disk 134D is stopped from rotation, and at the same time the main processing unit is induced to cut off power supply from the motor of the motor-driven vehicle.

What the invention claimed is:

1. A brake system mounted on a motor-driven vehicle and controlled to stop the motor-driven vehicle from moving and to simultaneously cut off power supply from the motor of the motor-driven vehicle, the brake system comprising:

a brake device driven by brake cable means to stop the motor-driven vehicle from moving;

two electrically conductive friction means respectively fastened to said brake device and driven by said brake device to press on two opposite sides of a metal part of wheel means of the motor-driven vehicle in stopping the motor-driven vehicle from moving;

a main processor, which controls the operation of the motor of the motor-driven vehicle; and two electric wires respectively connected between said electrically conductive friction means and two opposite terminals of said main processor;

wherein when said electrically conductive friction means are forced by said brake device to press on the two opposite sides of the metal part of the wheel means of the motor-driven vehicle, said electric wires are electrically connected to produce a signal to said main processing unit, causing said main processing unit to cut off power supply from the motor of the motor-driven vehicle.

2. The brake system of claim 1 wherein said electrically conductive friction means each have a tubular mounting rod at an outer side respectively fastened to said brake device; said electric wires are respectively connected to said electrically conductive friction means and extended out of the tubular mounting rods of said electrically conductive brake shoes.

3. The brake system of claim 2 wherein the tubular mounting rods of said electrically conductive friction means are respectively insulated from said brake device by electrically insulative means.

4. The brake system of claim 1 wherein said brake device comprises a binding ring, which supports said electrically conductive friction means, an insulative layer retained between said electrically conductive friction means and said binding ring, and a metal brake disk, which is forced by said electrically conductive friction means to stop the motor-driven vehicle from moving.

5. The brake system of claim 1 wherein said brake device comprises two brake arms, a metal brake disk mounted on a wheel, and two brake shoes respectively mounted on said brake arms and insulated from said brake arms by electrically insulative means and driven to stop said metal brake disk from rotation; said two electrically conductive friction means are respectively fastened to the brake shoes of said brake device and moved with said brake shoes to press on the two opposite sides of said metal brake disk.

6. The brake system of claim 1 wherein said electrically conductive friction means are made of rubber containing electrically conductive powder substances.

7. The brake system of claim 1 wherein said electrically conductive friction means are made of ceramics containing electrically conductive substances.

* * * * *